United States Patent [19]

Jouen et al.

[11] Patent Number: 5,075,637
[45] Date of Patent: Dec. 24, 1991

[54] CONTROL CIRCUIT FOR AMPLIFIED LISTENING

[75] Inventors: Philippe B. E. Jouen, Caen, France; Peter J. M. Sijbers, Panningen, Netherlands

[73] Assignee: U.S. Philips Corporation, New York, N.Y.

[21] Appl. No.: 505,212

[22] Filed: Apr. 4, 1990

[30] Foreign Application Priority Data

Apr. 4, 1989 [FR] France .................. 89 04407

[51] Int. Cl.⁵ .............................................. H03G 3/30
[52] U.S. Cl. ...................................... 330/279; 381/107
[58] Field of Search ........................ 330/279, 281, 284; 379/387, 388, 389, 390; 381/107

[56] References Cited

U.S. PATENT DOCUMENTS 4,750,203 6/1988 Defretin .......................... 379/390
4,910,797 3/1990 Min et al. ...................... 330/284 X Primary Examiner—Steven Mottola
Attorney, Agent, or Firm—Edward W. Goodman

[57] ABSTRACT

The invention relates to a control circuit for amplified listening having a shunt regulator ($A_0$, $T_1$) controlling at a value $V_0$ the supply voltage $V_B$ of an amplifier feeding a loudspeaker (1) for amplified listening, having a gain control input (G). When the regulator conducts an excessive current $I_s$, a switch (20) is closed and a storage capacitor ($C_{1g}$) is charged by a current source (SC). A threshold amplifier ($A_2$) opens a transistor ($T_4$) when the voltage $V_B$ falls below $V_1$ ($V_1 < V_0$). The capacitor ($C_{1g}$) is then rapidly discharged through resistor $R_{1g}$ (and $R_{2g}$).

10 Claims, 2 Drawing Sheets

CONTROL CIRCUIT FOR AMPLIFIED LISTENING

BACKGROUND OF THE INVENTION

1. Field of the Invention

The present invention has for its object to provide a control circuit for amplified listening comprising a shunt regulator arranged for regulating at a first reference value the supply voltage of an amplifier whose output is connected to a listening device, as well as a control device producing a control voltage for influencing the gain of the amplifier at least as a function of the current passing through the shunt regulator and including a storage device for storing a gain control voltage.

2. Description of the Related Art

Such a current is known from European Patent Application 189 711. With this circuit, the gain of the amplifier is reduced when the current passing through the shunt regulator decreases significantly. When the current passing through the shunt regulator is considered normal, the gain of the amplifier retains its nominal value.

This circuit is specifically intended to operate if there are signals having a constant amplitude (for example, dialling tones). On the other hand, it cannot be used to correct the gain in the presence of signals whose amplitude varies constantly (speech) because, without any time delay, it thus acts as a simple peak limiting circuit producing harmonics and thus distortion. In addition, it consumes a maximum current when the current available on the line is minimal.

The circuit as defined in Application document TEA 7531 by THOMPSON-CSF implements the same basic principle but with a considerable modification consisting in using a parallel resistance-capacitance circuit in which the gain of the amplifier is controlled as a function of the value of the voltage at the terminals of said capacitance. This arrangement has the disadvantage that it is intrinsically unstable and can only operate in an acceptable manner with long time-constants (various seconds) which are liable to reduce the amplitude of the oscillations.

SUMMARY OF THE INVENTION

It is an object of the invention to provide a circuit of the type mentioned above but having a different concept as to avoiding the instabilities and enabling to obtain satisfactory time constants for automatic gain control, in order to avoid distorted signals being noticed at the amplified listening loudspeaker.

The circuit according to the invention is thus characterized in that the control device comprises:
a first means for varying said stored voltage in accordance with a first variation law, in a first direction which corresponds with a gain increase when a current passes through the shunt regulator and for interrupting this action in the reverse case;
and a second means for varying, in accordance with a second variation law faster than the first one, said voltage stored in a second direction opposite to the first one when the supply voltage available at the supply terminals of the amplifier falls below a second reference value beneath the first reference value.

The current passing through the shunt regulator is thus only used to authorize the amplifier to reach its nominal gain. The second means comes into action when the voltage at the supply terminals of the amplifier is lower than the first reference value. In that case and according to the same principle of a shunt regulator, no current passes through this regulator and the first means is inactive. Thus, the problem of the instability of the prior-art device is avoided and for the gain reduction of the amplifier a variation law may be chosen presenting a shorter time constant than in the prior art.

The second reference value may be chosen to be in the neighborhood of the minimum supply voltage corresponding with a correct operation of the amplifier.

According to a particularly advantageous embodiment, the storage device comprises a serial branch that includes a resistor connected in series to a storage capacitor, and of which a first end is connected to the common-mode pole and of which the second end, delivering said stored voltage, is connected to a gain control terminal of the amplifier. The amplifier may be arranged in a manner such that the gain is an ascending function of the control voltage. In this way the capacitor is not charged until a maximum current is available.

The first means may comprise a current source of a given strength and including a first switching device intended to control the charging of said storage capacitor by said current source, only when current passes through the shunt regulator. Thus it will be achieved that when the supply of the circuit is considered satisfactory, the amplifier gain will attain its nominal value in a controlled manner.

The second means may comprise a second switching device intended to control the delayed discharging of said capacitive element according to said second law.

The first and second switching devices may present a first and a second threshold circuit, respectively, connected each to the common points of two resistors out of a group of three resistors connected in series to the supply terminals of the circuit.

The second switching device may comprise a switch transistor of which the collector-emitter path is disposed between the second end of said serial branch and the common-mode pole.

According to an advantageous embodiment, a fifth resistor may he connected in series between said gain control terminal and the collector-emitter path of said switching transistor and its value is then chosen in a manner so as to maintain it at a saturated level during said delayed discharging of the storage capacitor.

According to a preferred embodiment, the first means comprises a current comparator for comparing the current passing through the shunt regulator to a reference current.

BRIEF DESCRIPTION OF THE DRAWINGS

The invention will be better understood when reading the following description given by way of non-limiting example with reference to the drawings, in which.

DESCRIPTION OF THE PREFERRED EMBODIMENT

Figure 1:
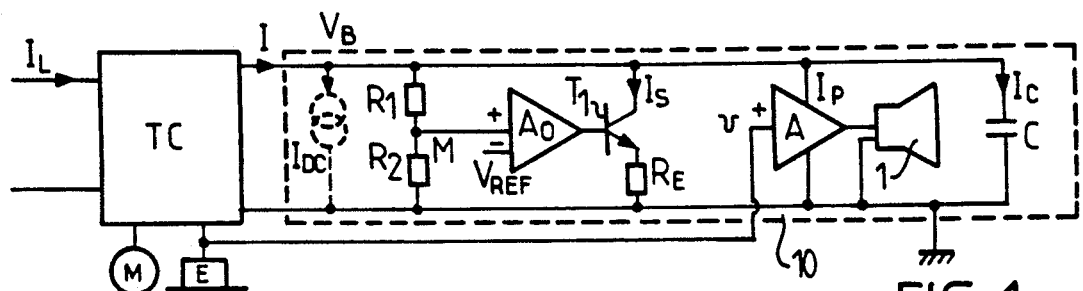
FIG. 1 shows a prior-art subscriber station comprising an amplified listening circuit of which the supply voltage is controlled by a shunt regulator.

According to FIG. 1 a subscriber station comprises a transmission circuit TC whose inputs are connected to a line delivering a current $I_L$, as well as a microphone M. The outputs feed a telephone receiver E and an amplified listening circuit 10. The transmission circuit TC supplies a current I feeding the amplified listening circuit 10 which comprises an amplifier A, a loudspeaker 1 and a shunt regulator ($R_1$, $R_2$, $A_O$, $T_1$, $R_E$). The latter has for its function to prevent the supply voltage $V_B$ of the amplifier A from exceeding a reference value $V_O$. The two resistors $R_1$ and $R_2$ form a serial branch which is disposed at the supply terminals of the amplified listening circuit. Their common point M is connected to the noninverting input of the amplifier $A_O$ whose inverting input is connected to a reference voltage $V_{REF}$ The output of the amplifier $A_O$ is connected to the base of a transistor $T_1$ whose collector-emitter path is connected to the supply terminals of the amplified listening circuit and has an emitter resistor $R_E$. When the voltage at point M exceeds $V_{REF}$, the transistor $T_1$ is conductive and carries a current $I_s$ which leads to a lower $V_B$. When the voltage at point M falls short of $V_{REF}$, the transistor $T_1$ blocks and the shunt regulator is inactive. In the intermediate operating zone, the shunt regulator conducts a current which is a function of the value $V_B$.

Thus one has:

Thus one has:
$$V_0 = \frac{R_1 + R_2}{R_2} V_{REF}$$

In order to avoid the voltage $V_B$ dropping too fast below $V_O$, a capacitor C is connected to the supply terminals. In general, the capacitor C is a discrete component associated to an integrated circuit for amplified listening that feeds the loudspeaker 1.

Figure 2:
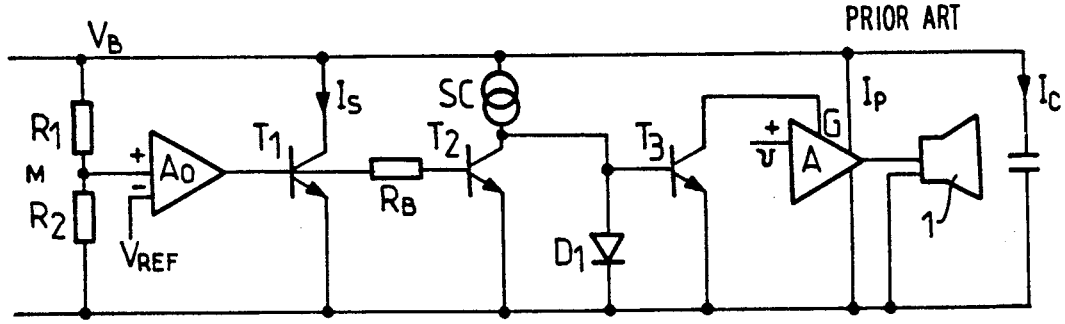
FIG. 2 shows a gain control circuit of an amplified listening loudspeaker according to European Patent 189 711 mentioned hereinbefore.

According to FIG. 2, a transistor $T_2$, whose base is connected to that of transistor $T_1$ through a resistor $R_B$, has its base-collector path connected in series to a current source SC, thus forming a serial branch connected to the supply terminals. The common point of the current source and the collector of transistor $T_2$ is connected to the base of a transistor $T_3$ whose collector is connected to the gain control input G of the amplifier A and whose emitter is connected to the common-mode pole. A diode $D_1$ is furthermore branched in the forward direction between the base and the emitter of the transistor $T_3$ to form a current mirror circuit.

If $V_B$ exceeds $V_O$, the transistor $T_2$ is conductive and a fraction of the current of the current source SC passes through the diode $D_1$ and is copied by the collector current of the transistor $T_3$. The latter current is cancelled once the instantaneous value of the current $I_s$ attains a threshold fixed by $R_B$, the current value of the current source SC and the proportion of the emitter dimensions of the transistor $T_1$ to $T_2$.

If $V_B$ falls short of $V_O$, the transistor $T_2$ is cut off and the current of the current source SC passes through the diode $D_1$ which causes the current of the collector of the transistor $T_3$ to have a maximum value. This is a disadvantage because the current consumption of the gain reduction circuit is maximum just when the current available on the line has its lowest level. In the intermediate operating zone, a current, which is the difference between the current supplied by the current source SC and the collector current of the transistor $T_2$, passes through the transistor $T_3$.

This current is not suitable for correcting the gain in the presence of signals such as speech, because, without a time delay, it operates as a peak limiter and the listener will hear distorted signals.

Figure 3:
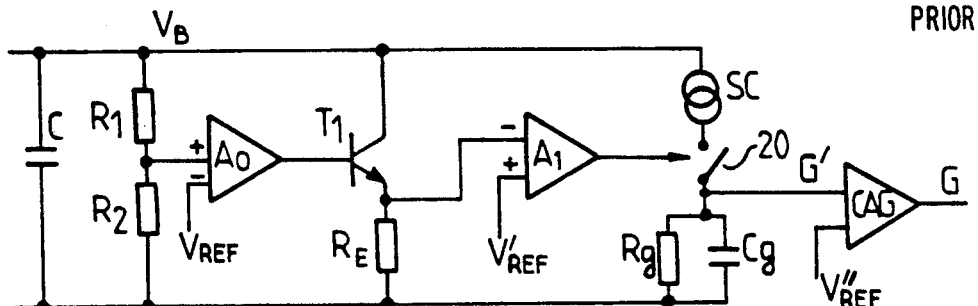
FIG. 3 shows a gain control circuit in accordance with the TEA 7531 circuit by THOMPSON-CSF.

According to FIG. 3, the circuit comprises a parallel branch Rg, Cg intended to store an automatic gain control voltage. An amplifier $A_1$ has its inverted input connected to the emitter of the transistor $T_1$ including emitter resistor $R_E$ and its non-inverting input is connected to a reference voltage $V'_{REF}$. Its output signal controls, on an on/off basis, a switch 20 (for example, a transistor arranged in the switch mode). This switch 20 is connected in series to the current source SC and the parallel branch Rg, Cg. The terminal of this parallel branch, connected to the switch 20, is also connected to the input of an amplifier CAG whose other input is connected to the reference potential $V''_{REF}$ and whose output is connected to the automatic gain control input G of the amplifier A.

If $V_B < V_O$, the transistor $T_1$ is cut off, the output of the amplifier $A_1$ has a high level and the switch 20 is closed; thus the current source SC having a strength of $I_{SC}$ charges the capacitor Cg to a voltage $V_{cg}$. ($V_{cg}$ max $= Rg \times I_{sc}$).

If $V_B > V_O$, the transistor $T_1$ is conductive and the output of amplifier $A_1$ (depending on the level of $I_s$) has a level 0 which causes the switch 20 to open, the switch 20 remaining closed until the current collector $I_s$ of the transistor $T_1$ reaches a level so that:

$R_E I_s = V_{REF}$ because $I_s \sim$ emitter current of $T_1$.

The automatic gain control is activated if the voltage at the terminals Cg exceeds $V''_{REF}$.

Figure 3A:
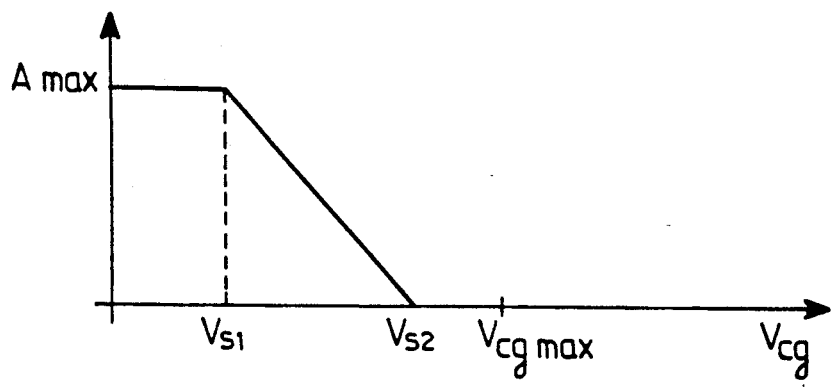
FIG. 3a is a graph plotting the gain curve against the voltage for the circuit of FIG. 3.

If $V_B$ becomes less than $V_O$, the switch 20 is closed and the capacitor Cg is charged (time constant determined by Cg, Rg and SC). The gain thus decreases with a certain delay corresponding with the charging of the capacitor C which is continued. Cg continues to be charged as long as $V_B$ has not again reached $V_O$. In practice, the drop of the gain is compensated excessively The gain is increased again by discharging the capacitor Cg through the resistor Rg. The renewed gain increase tends to make $V_B$ fall below $V_O$. In practice, the result of this is a triangle amplitude modulation of the signal. In order to alleviate this disadvantage a high-value capacitor Cg (several 10 $\mu$F), thus non integrable, is charged by a small current (SC thus has a current of several $\mu$A). The amplitude of the triangle modulation is thus no longer unpleasant but the constraint of a high-value capacitor Cg remains, as well as the fact that the capacitor Cg is to be charged at the moment when the available current is the lowest. The gain curve plotted against the voltage $V_{cg}$ is represented in FIG. 3a. This curve has a decreasing trend.

Furthermore, the time constant thus induced (Rg, Cg) is of the order of 1 second which does not have any effect on the distortions produced by amplitude peaks of speech, for which a system is necessary that shows a fast response.

Figure 4:
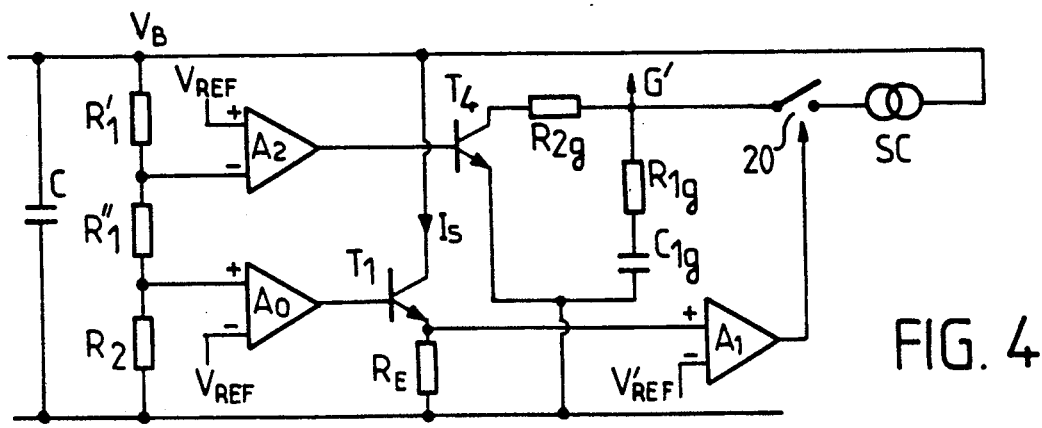
FIG. 4 shows a circuit according to the present invention.

According to FIG. 4, a circuit according to the invention comprises three series resistors $R'_1$, $R''_1$ and $R_2$ inserted between the supply terminals of amplifier A (not shown). The amplifier $A_O$ has its non-inverting input connected to the common point of the resistors $R''_1$ and $R_2$. The circuit also comprises transistor $T_1$, the resistor $R_E$, amplifier $A_1$, the current source SC and switch 20, arranged as shown in FIG. 3, but the emitter of the transistor $T_1$ is connected to the non-inverting input of the amplifier $A_1$. In addition, the storage and use of the gain control voltage is realized in an utterly different manner. A serial branch, constituted by a resistor $R_{1g}$ and a storage capacitor $C_{1g}$ is inserted between the common-mode pole and the gain control input G of amplifier A. The switch 20, for example, a transistor operating in the switch mode, has for its function to connect the current source SC to the serial branch (point G') when the shunt regulator derives current (transistor $T_1$ not cut off), which enables to charge in a delayed manner the capacitor $C_{1g}$ to reach the maximum gain, as is also the case in FIG. 3. In order to discharge the capacitor $C'_{1g}$ (and produce a decrease of the gain of the amplifier A by lowering the voltage at the point G'), a threshold arrangement is used which discriminates a second voltage threshold which is lower than the threshold of the shunt regulator. An amplifier $A_2$ has its noninverting input connected to the potential $V_{REF}$ and its inverting input connected to the common point of the resistors $R'_1$ and $R''_1$.

The output of amplifier $A_2$ is connected to the base of a transistor $T_4$ whose collector-emitter path is disposed between the point G' and the common-mode pole. A resistor $R_{2g}$ may be inserted between the collector of transistor $T_4$ and the point G' and its value is chosen to ensure that the transistor $T_4$ is in its saturated state when it is commanded to be conductive.

The first threshold value $V_O$ which controls the operation of the shunt regulator has for its value:

$$V_0 = \frac{R'_1 + R''_1 + R_2}{R_2} V_{REF}$$

The second threshold value $V_1$ which controls the discharging of the storage capacitor $C_{1g}$ has for its value:

$$V_1 = \frac{R'_1 + R''_1 + R_2}{R''_1 + R_2} V_{REF} < V_0$$

Figure 4A:
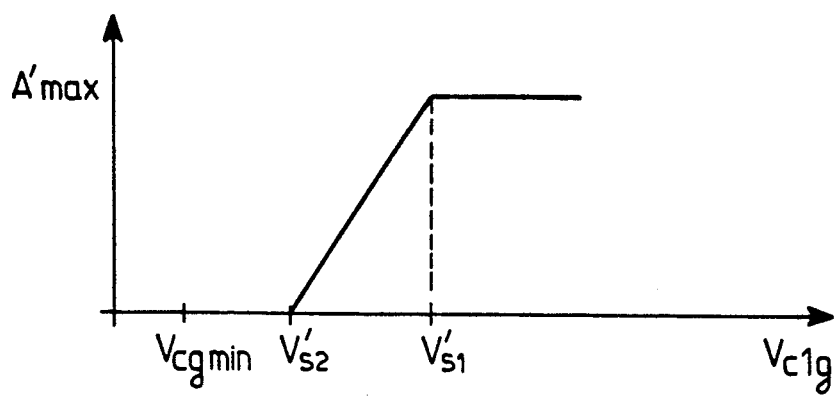
FIG. 4a is a graph plotting the gain curve against the voltage for the circuit of FIG. 4

Thus, the following operation is obtained. If $V_B > V_O$, the transistor $T_1$ carries a shunt current $I_s$. For $R_E I_s > V''_{REF}$, the output of the amplifier $A_1$ has a maximum level which controls the closing of the switch 20. The current source SC charges the capacitor $C_{1g}$. If the capacitor $C_{1g}$ is fully charged, the amplifier A has its maximum gain. If $V_B$ is situated between $V_1$ and $V_O$, the shunt regulator no longer derives current and the switch 20 is open. The capacitor $C_{1g}$ retains its stored value. The capacitor C is capable of compensating for a brief moment. If the value $V_B$ continues to drop to below the second threshold $V_1$, then the transistor $T_4$ changes to the open state, and the capacitor $C_1$ is discharged through the resistor $R_{1g}$ (and possibly $R_{2g}$). The voltage drop through $R_{1g}$ changes the voltage at point G' and instantaneously changes the gain. The discharging time constant is very short which permits to reduce the gain almost instantaneously. The transistor $T_4$ thus has to be provided to allow to pass such a current. The consumption of the loudspeaker is thus diminished so that $V_B$ stops decreasing and without the need to discharge Cg too much. The value of $R_{1g}$ (and possibly $R_{2g}$) is preferably adjusted such that the voltage at the terminals of $C_{1g}$ connects the new value to be stored with a single low-amplitude transgression, and therefore, relatively short (about 10 ms in practice). On the other hand, recharging the capacitor $C_{1g}$, completely or partly discharged, cannot take place until $V_B$ again reaches the threshold $V_O$ and the shunt regulator conducts a significant current $I_s$. The capacitor $C_{1g}$ is thus recharged progressively owing to the current source SC and the gain starts to augment again. This recharging is effected more slowly than the discharging and can be interrupted once the shunt current $I_s$ is too small. The stability of the system is thus very good. In addition, the capacitor $C_{1g}$ cannot be charged until a maximum current is available. The gain curve plotted against $V_{cg}$ is represented in FIG. 4a. This curve has a rising trend.

Since the discharging of $C_{1g}$ is fast, one may choose for $V_1$ a value near to the minimum supply voltage for which the operation of the amplifier A is correct (little distortion). This likewise has the advantage that the sudden gain drops are then situated on very important peaks of the speech signal and are not audible. In effect, a sudden gain drop produces considerable distortion but the ear does not notice this type of distortion until its repetition frequency is high.

It is not necessary to use a capacitor of high value.

One may choose for $C_{1g}$ a value of 0.5 μF, and a current source of 1 μA. The presence, if any, of resistor $R_{2g}$ enables to limit, if necessary, the discharging current through transistor $T_4$ and to avoid too sudden a discharging of the capacitor $C_{1g}$ which would produce a passage at minimum gain each time a disturbance occurs.

By way of example one may have $R_{1g} = 3.6$ kΩ and $R_{2g} = 0$ Ω. In practice the difference between $V_O$ and $V_1$ may be of the order of several hundred mV for a voltage $V_O$ of the order of 3.5 V.

Figure 5:
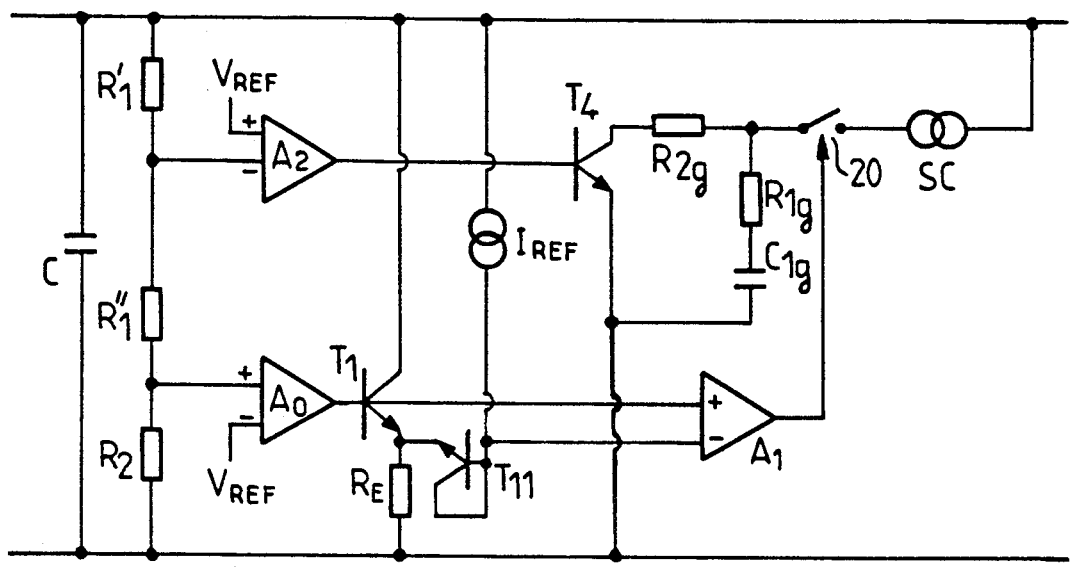
FIG. 5 shows a preferred embodiment of the invention.

FIG. 5 corresponds with a preferred embodiment according to which one becomes independent of variations due to the method. Instead of comparing $R_E I_s$ and $V'_{REF}$, one compares $I_s$ to a reference current $I_{REF}$ (apart from a multiplication coefficient). In order to achieve this, a reference current source $I_{REF}$ is connected between the supply voltage source and the inverting input of the amplifier $A_1$, and a transistor $T_{11}$; arranged as a diode (npn transistor whose collector and base are short-circuited), is inserted between the inverting input of amplifier $A_1$ and the emitter of transistor $T_1$ of the same type. The non-inverting input of amplifier $A_1$ is connected to the base of transistor $T_1$.

Amplifier $A_1$ thus acts as a comparator and measures $$I_s < r \, I_{REF}$$

where r is the ratio between the emitter surfaces of the transistors $T_1$ and $T_{11}$.

An additional advantage is that as $R_E$ does not intervene in the measurement, its value may be chosen to optimize the stability of the control loop of voltage $V_B$. Furthermore, it is relatively simple to achieve that r and $I_{REF}$ vary little with respect to each other with the method according to which it is more difficult to determine $V'_{REF}$ and $R_E$ in correlation with each other.

We claim:

1. Control circuit for amplified listening comprising a shunt regulator for regulating, at a first reference value, a supply voltage of an amplifier having an output connected to a listening device, and a control device for producing a control voltage for influencing the gain of the amplifier at least as a function of current passing through the shunt regulator and including a storage device for storing a gain control voltage, characterized in that the control device comprise:

a first means for varying said stored voltage, in accordance with a first variation law, in a first direction which corresponds with a gain increase when the current passing through the shunt regulator exceeds a predetermined threshold value, and for interrupting this action when the current passing through the shunt regulator does not exceed said predetermined threshold value; and a second means for varying, in accordance with a second variation law faster than the first variation law, said voltage stored in a second direction opposite to the first direction when the supply voltage available at the supply terminals of the amplifier falls below a second reference value beneath the first reference value.

2. Circuit as claimed in claim 1, characterized in that the second reference value lies in the neighborhood of a minimum supply voltage corresponding with a correct operation of the amplifier.

3. Circuit as claimed in claim 1, characterized in that the storage device comprises a serial branch that includes a resistor ($R_{1g}$) connected in series to a storage capacitor ($C_{1g}$), and of which a first end is connected to a common-mode pole and of which the second end, delivering said stored gain control voltage, is connected to a gain control terminal of the amplifier.

4. Circuit as claimed in claim 3, characterized in that the gain control terminal of the amplifier is arranged such that the gain is an ascending function of the control voltage.

5. Circuit as claimed in claim 4, characterized in that the first means comprises a current source of a given strength and including a first switching device for controlling the charging of said storage capacitor by said current source, only when current passes through the shunt regulator.

6. Circuit as claimed in claim 5, characterized in that the second means comprises a second switching device for controlling a delayed discharging of said storage capacitor according to said second variation law.

7. Circuit as claimed in claim 6, characterized in that the first and second switching devices have a first and a second threshold circuit, respectively, each connected to a common point of two resistors out of a group of thee resistors connected in series to the supply terminals of the circuit.

8. Circuit as claimed in claim 6, characterized in that the second switching device comprises a switch transistor ($T_4$) for controlling said delayed discharging and of which the collector-emitter path is disposed between the second end of said serial branch and the common-mode pole.

9. Circuit as claimed in claim 8, characterized in that the said control circuit further comprises a fifth resistor connected in series between said gain control terminal and said switching transistor and having a value chosen so as to maintain said switching transistor at a saturated level during the delayed discharging of the storage capacitor.

10. Circuit as claimed in claim 8, characterized in that the said first means comprises a current comparator for comparing the current passing through the shunt regulator to a reference current.

* * * * *